Patented June 8, 1948

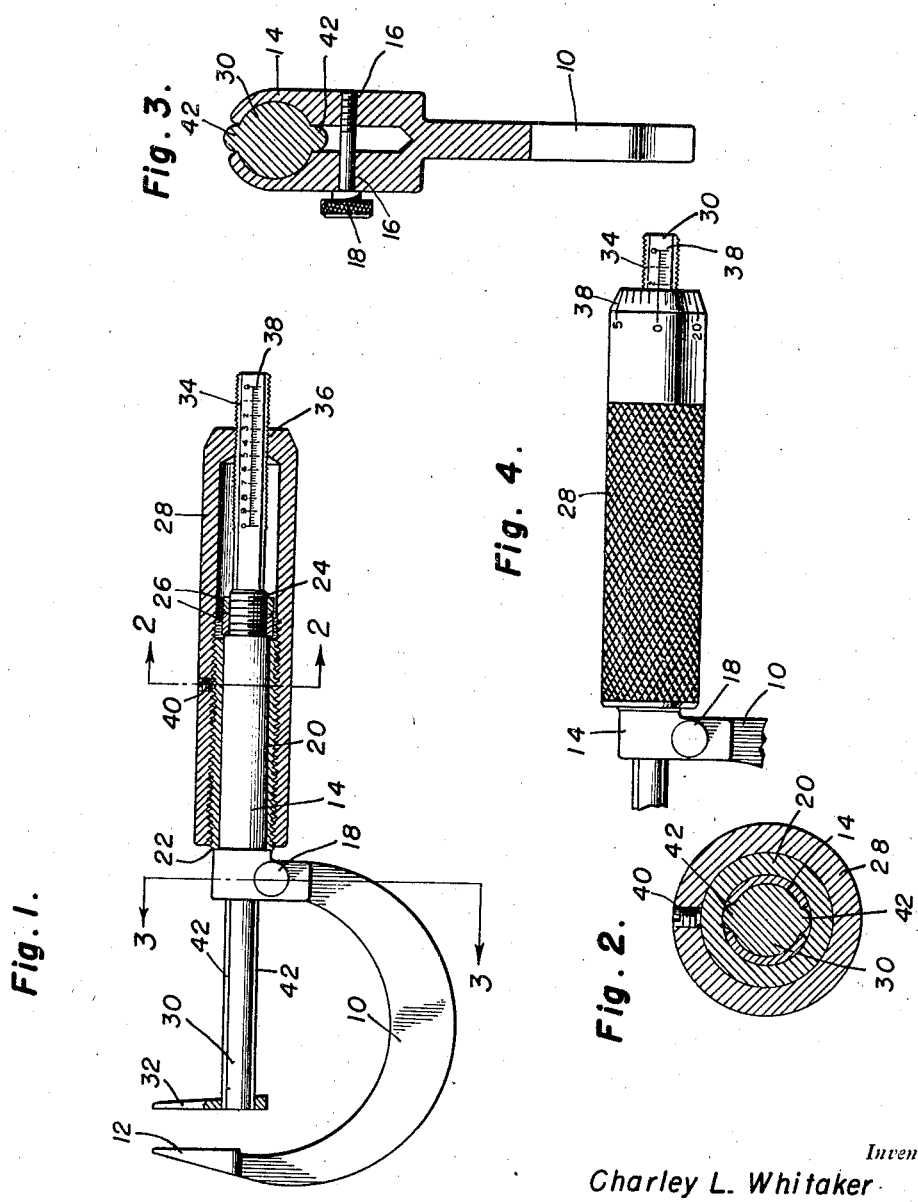

2,443,126

UNITED STATES PATENT OFFICE 2,443,126

MICROMETER

Charley L. Whitaker, Madera, Calif.

Application March 11, 1947, Serial No. 733,964

6 Claims. (Cl. 33—164)

This invention appertains to novel and useful improvements in instruments, particularly measuring devices.

An object of this invention is to provide improved means for accurately measuring distances.

Another object of this invention is to provide an improved means for journaling a barrel or outer housing of the micrometer measuring means.

Another object of this invention is to provide improved means for taking out end play from the invention, thereby increasing accuracy.

A further object of this invention is to provide a device of the character described which is extremely simple and relatively inexpensive to manufacture, since various machining operations and various elements are obviated in the preferred embodiment of the present invention, which are necessary in conventional measuring instruments of this nature.

Ancillary objects and features of novelty will become apparent to those skilled in the art in following the description of the preferred embodiment of the present invention, illustrated in the accompanying drawings, wherein:

Figure 1 is an elevational side view of the preferred form of the present invention, parts being shown in section for clarity;

Figure 2 is a transverse sectional view of the invention disclosed in Figure 1 and taken substantially on the line 2—2 thereof and in the direction of the arrows;

Figure 3 is a transverse sectional view of the invention disclosed in Figure 1 and taken substantially on the line 3—3 thereof and in the direction of the arrows; and Figure 4 is a fragmentary elevational view of a selected portion of the present invention showing particularly the barrel construction and indicia registering elements, forming part of the present invention.

Referring now in detail to the illustrated preferred embodiment of the present invention, like reference characters are used throughout to indicate similar elements thereof.

This invention has been devised to provide a device for measuring accurately distances. One of the prime purposes of the present invention is to provide an accurate micrometer which is relatively simple and inexpensive to manufacture. Provision is made in the arrangement of elements whereby certain conventional micrometer elements are eliminated and certain machining operations are completely obviated thereby lowering the cost of production.

Taking now Figure 1 which is most descriptive, an arcuate frame 10 is provided with an anvil 12 at one end thereof and a split sleeve 14 at the other end thereof. Aligned apertures 16 are provided in said split sleeve and a selected one of said apertures is provided with a threaded bore. Adjusting means are provided in the said aligned apertures, said adjusting means being preferably a thumb screw 18.

An externally threaded tube 20 is rotatably received on the said sleeve 14, abutting the shoulder 22 provided integral with the sleeve 14. A reduced portion 24 is received on the end of the said sleeve 14 and is externally threaded. Friction locking means, in the form of a pair of nuts 26, is provided on said reduced portion 24 for the purpose of taking out end play of the said tube 20. It may be readily seen from an inspection of Figure 1 that the said limiting means 26 provides an effective thrust bearing for the said tube 20.

A barrel or housing 28 is threadedly received on the said tube 20. An arm 30 having an anvil 32 at one end thereof is slidably received in said split sleeve 14. The said anvil 32 may be suitably secured by any conventional means to said arm 30, such as by pressing the same thereto. The opposite end of said arm 30 has threads 34 thereon of a predetermined number per inch and are engageable with complemental threads 36 in the end of the said housing 28. Suitable micrometer indicia 38 is provided on the same arm 30 and adjacent the terminal portion of the housing 28. The only difference between the indicia borne on the above mentioned element from that of a conventional micrometer is the fact that the zero point is at the terminal portion of the arm, rising in numerical value toward the intermediate portion thereof. Conventional micrometers operate so that the indicia is reversed relative to the disclosed markings 38.

Means for fixing the housing 28 relative to the sleeve 20 are provided. The preferable means is a simple set screw 40 provided in a suitable aperture in the said housing 28. This set screw abuts the threaded portion of the sleeve 20, thereby holding the sleeve and housing in fixed relation. This expedient is provided with the obvious purpose of supplying a means for adjusting or setting the micrometer to a substantially exact adjustment.

Oppositely aligned protuberances 42 are provided integral with the arm 30 and are slidably received in the slots of said slotted sleeve 14. By this expedient, the arm 30 will be fixed relative to rotation in the sleeve 14. The set screw means 18 may be utilized for the usual purpose of securing the arm 30 in fixed position after measurements are taken.

There has been described the preferred embodiment of the present invention which obviates many conventional micrometer elements as well as many expensive and tedious machining operations.

Due to the extreme mechanical simplicity characterized by this invention, a further description thereof is deemed unnecessary. However, it is apparent to those skilled in the art that variations including changes as to size and shape may be made herein without departing from the spirit of the invention. Accordingly, limitation is sought only in accordance with the scope of the following claims.

Having thus described the present invention, what is claimed as novel and improved is as follows:

1. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means in said sleeve and arm for guiding said arm, cooperating means on said arm and housing for adjustably moving said arm relative to said anvil and indicia on said arm housing.

2. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means in said sleeve and arm for guiding said arm, cooperating means on said arm and housing for adjustably moving said arm relative to said anvil and indicia on said arm housing, said limiting means comprising friction securing means engaging said tube.

3. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means in said sleeve and arm for guiding said arm, cooperating means on said arm and housing for adjustably moving said arm relative to said anvil and indicia on said arm housing, said guide means comprising slots in said sleeve and protuberances on said arm slidably received in said slots.

4. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means in said sleeve and arm for guiding said arm, cooperating means on said arm and housing for adjustably moving said arm relative to said anvil and indicia on said arm housing, said cooperating means comprising complemental threads on said arm and housing.

5. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means on said arm and housing for adjustably moving said arm relative to said anvil and indicia on said arm housing, said guide means comprising slots in said sleeve and protuberances on said arm slidably received in said slots, said limiting means including frictionally bound collars engaging said tube.

6. A micrometer comprising an arcuate frame, an anvil at one end and a split sleeve at the other end thereof, a threaded tube rotatively received on said sleeve, a housing threadedly received on said tube, means for locking said housing to said tube, means on said sleeve for limiting the travel of said tube, an arm extending through said sleeve, means in said sleeve and arm for guiding said arm, cooperating means on said arm and housing for adjustably moving said arm relative to said anvil and indicia on said arm housing, said guide means comprising slots in said sleeve and protuberances on said arm slidably received in said slots, said cooperating means comprising engaged threads on said arm and housing.

CHARLEY L. WHITAKER.